United States Patent [19]

Polhede et al.

[11] 4,244,557
[45] Jan. 13, 1981

[54] HIGH VACUUM SEAL

[75] Inventors: Wilhelm Polhede, Bruchköbel; Reinhard Reiter, Höchst, both of Fed. Rep. of Germany

[73] Assignee: Leybold-Heraeus GmbH, Köln-Bayenthal, Fed. Rep. of Germany

[21] Appl. No.: 948,308

[22] Filed: Oct. 3, 1978

[30] Foreign Application Priority Data

Oct. 7, 1977 [DE] Fed. Rep. of Germany ....... 2745139
Sep. 18, 1978 [DE] Fed. Rep. of Germany ....... 2840618

[51] Int. Cl.³ ............................................. F16K 25/00
[52] U.S. Cl. ................................... 251/167; 251/204; 251/368
[58] Field of Search ........................ 251/167, 204, 368

[56] References Cited

U.S. PATENT DOCUMENTS

| 920,178 | 5/1909 | Plantinga | 251/167 |
|---|---|---|---|
| 948,359 | 2/1910 | Watson | 251/167 |
| 2,520,364 | 8/1950 | Hobbs | 251/167 |
| 3,815,868 | 6/1974 | Bobo | 251/167 X |
| 3,854,697 | 12/1974 | Salloga | 251/167 |
| 3,973,753 | 8/1976 | Wheeler | 251/368 |
| 3,974,869 | 8/1976 | Abe | 251/368 X |
| 4,019,534 | 4/1977 | Clements | 251/368 X |
| 4,126,295 | 11/1978 | Natalizia | 251/368 X |

*Primary Examiner*—Harold W. Weakley
*Attorney, Agent, or Firm*—Spencer & Kaye

[57] ABSTRACT

A vacuum-tight closure assembly includes a valve seat; a spreadable valve plate movable into a closed position for assuming a spreaded state in which it sealingly engages the valve seat; and a guide arrangement for a centered guiding of the valve plate during its motion into the closed position. The guide arrangement includes guide faces located in the vicinity of and stationarily with respect to the valve seat and counterguide faces located on and movable with the valve plate. The guide faces cooperate with the counterguide faces during the motion of the valve plate towards the closed position.

17 Claims, 3 Drawing Figures

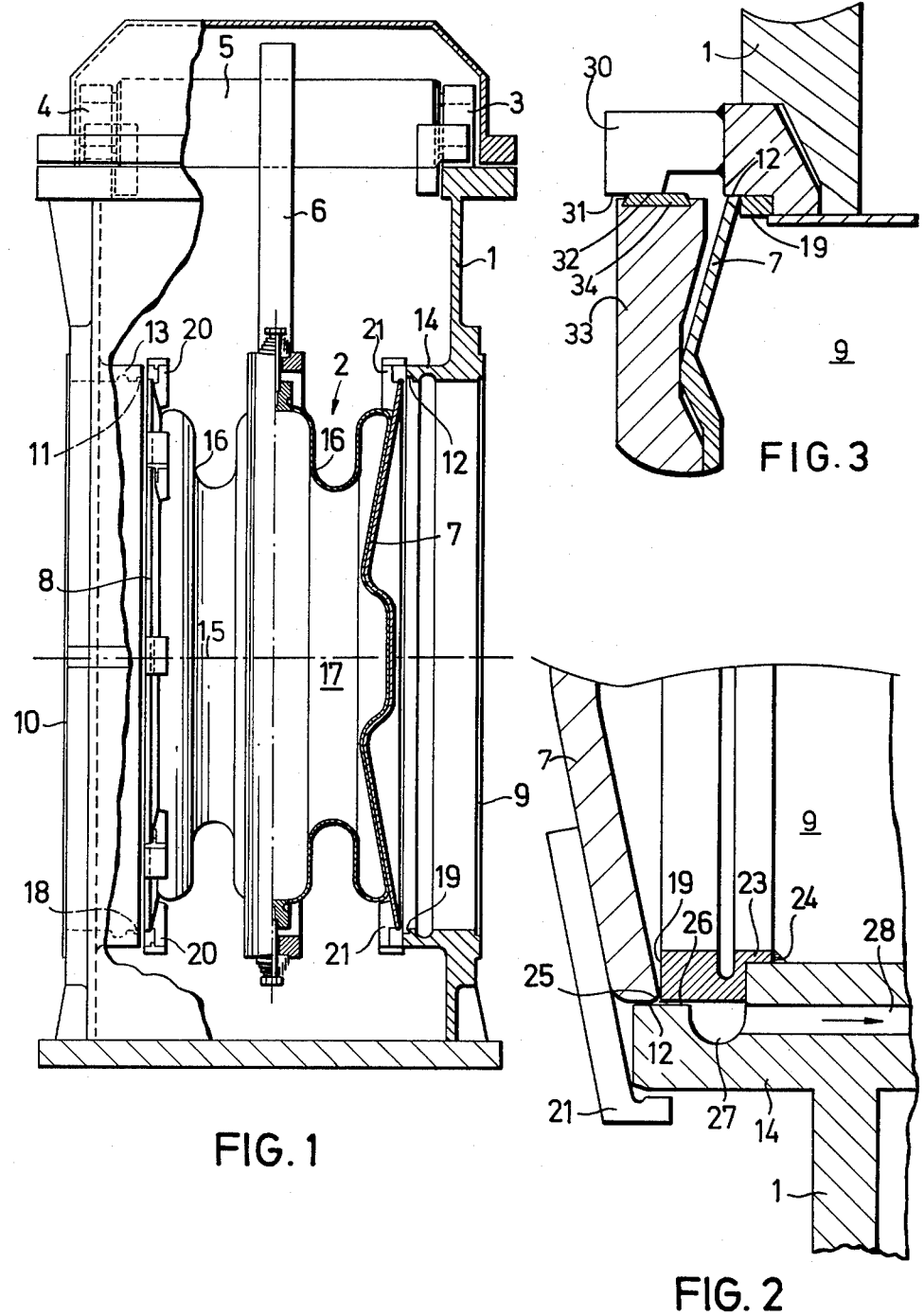

HIGH VACUUM SEAL

BACKGROUND OF THE INVENTION

The invention relates to a high vacuum tight closure for preferably large nominal widths including a valve seat, a spreadable valve plate and means for centering and guiding the valve plate during its closing movement.

For heatable high vacuum systems, particularly for use in nuclear installations, the need for containment assemblies having metallic seals is increasing since such seals must be heatable to temperatures of more than 300° C. and their radiation resistance is significantly better than that of elastomer seals.

In order to obtain the desired low leakage rate (better than $10^{-8}$ mbar·l·s$^{-1}$ for a nominal width up to 1000 mm) for metallic seals, for the surfaces of the sealing members have to adapt themselves to one another by way of plastic and/or elastic deformation so that the remaining gap lies in the order of magnitude of the surface roughness. To achieve such a result, there are needed high contact pressure forces and extremely clean sealing faces that are completely free of flaws. It is therefore a disadvantageous for the sealing faces if any kind of friction is generated thereon.

German Offenlegungsschrift [Laid-Open Patent Application] No. 25 11 591, to which corresponds U.S. Pat. No. 3,973,753, discloses the provision of three beads along the outer edge of the spreadable valve plate; the outer beads are protective beads while the inner bead constitutes the actual sealing face or edge. The protective bead facing the opening to be sealed also serves to guide the plate during its closing movement. During the closing movement, this protective bead moves past the sealing face forming the valve seat so that it cannot be prevented that during the closing movement friction appears between the frontal protective bead and the sealing face. This results in undesirable grooves in the valve seat which may lead to a considerable increase in the leakage rate. Precisely in particularly large sealing systems installed in nuclear plants, faulty sealing faces result in long and costly interruptions of operation. Further the possibility is not excluded that friction appears also between the actual sealing faces before the valve plate has assumed its closed position.

SUMMARY OF THE INVENTION

It is the object of the present invention to provide an improved high vacuum-tight closure of the above-outlined type, in which the generation of undesired friction at the sealing faces during the closing movement is reliably avoided. This object and others to become apparent as the specification progresses, are accomplished by the invention, according to which, briefly stated, in the region of the valve seat guide faces are provided which are spaced from the actual sealing edge and with which there are associated components connected with the valve plate and provided with counterguide faces. Further, the valve seat is disposed within a pipe section and guides associated with the exterior of the pipe section are fastened at the outer area of the valve plate.

In a closure designed in this manner the sealing faces themselves do not serve to center and guide the valve plate so that no undesirable contact of the guide means with the valve seat can occur. The plate itself can be brought to its end position with the aid of these guides (before the valve plate is actually spread) without the sealing faces contacting one another. Thus, in this phase, no undesirable friction occurs between the sealing faces. The guide faces connected with the valve seat and the counterguide faces connected with the valve plate may be designed in the most varied ways. For example, they may be formed by compartments—for example, two or more abutments—which protrude beyond the plane formed by the sealing edge. The associated counterguide faces may be provided on components which are fastened to the valve plate or to a support for the valve plate. The outer edge of the carrier may also be designed as the counterguide face. It is only of importance that the guide and counterguide faces must be essentially concentric with respect to the axis of the valve.

In another advantageous embodiment, the valve seat is disposed within a pipe section. The interior and/or exterior faces of this pipe section may then serve as the guide faces. In such a solution it is advisable to arrange the counterguide faces at the inside of the free ends of angle pieces which are fastened to the valve plate and which surround the pipe end. A significant advantage of a closure designed in this manner is that spreading of the plate causes the guides to be lifted away from the outer face of the pipe end. During the spreading process, the plate can therefore freely center itself in the this circumstance also reduces to a minimum the friction which could possibly develop during the spreading process. During the opening phase, reduction of the spreading action has the result that the guides again contact the guide face formed by the outer face of the pipe end and thus bring the valve plate into a position in which the sealing faces no longer contact. Thus it is assured that no undesirable friction develops during the opening movement as well.

A further suitable embodiment of the closure according to the invention is characterized in that an abutment disposed parallel to the plane of the plate is provided for the valve seat and the valve seat is formed by a cylindrical face. With such an embodiment it is accomplished that the sealing edge of the plate moves perpendicularly to the seat surface during the spreading process, that is it moves almost without any damaging friction components. Thus an extremely high number of closing operations are possible without a wear of the cooperating sealing-faces. A further advantage is that the cylindrical valve seat and the guide faces which are concentric with the valve axis can be machined to as jointly clamped workpieces so that the tolerances with respect to these faces are reduced to the minimum possible in manufacture. Tests have shown that with such a device more than 1000 closing operations can be performed without the leakage rate increasing above $10^{-10}$ Torr l·s$^{-1}$. The abutment limits the axial movement of the valve plate and assures that the sealing edge of the plate and the seat always contact one another on the same sealing line. Moreover, the simple design of the valve seat, the abutment and the valve plate permits an accurate working of the sealing faces without undue to manufacturing expenses. Materials suitable for the valve plate and the valve seat are those which harden when their surfaces are stressed. Thus they are first plastically deformable and then elastically. Slight relative errors in shape between the plate and the seat are compensated during the plastic deformation phase. Thereafter the sealing line hardens which also increases the wear resistance of the surface so that it can withstand very high sealing forces. Materials having these properties are high strength nickel alloys which should also have a very high yield strength so that it is possible to spread the plate very extensively.

It is furthermore expedient to dispose the guide faces and the cylindrical valve seat on a common cylindrical surface around the valve axis. Machining the parts as jointly clamped workpieces is then particularly easy.

The sealing edge of the plate is expediently coated with a noble metal (e.g. fine gold). This eliminates cold welding of the materials at the location of the seal. Moreover, almost all of these materials are insensitive to ionizing radiation which is of particular significance for their use in nuclear installations.

In a further advantageous embodiment, a separate abutment ring is provided for the plate. Such an abutment ring is a simple part which is manufactured separately and can then be installed in the valve seat. Moreover, this type of structure permits the provision of an intermediate evacuation in the area between the sealing line and the abutment line. This intermediate evacuation occurs through the gap between the abutment ring and the cylindrical extension of the valve seat. Since the thus formed gap opens in the immediate vicinity of the sealing line, the gap can also be used to blow-clean the sealing line with the aid of a surge of compressed air before it is actually stressed.

Expediently the high vacuum-tight closure according to the invention is designed in the form of a pendulum valve. This makes it possible to open the entire flow cross section when the valve is opened. Moreover, it is feasible to provide both conduits opening into the valve housing with a closure according to the invention. When compression forces are generated, the plates will then mutually support one another. In such an embodiment the sealing force can be generated pneumatically. Spreading means acting on the plates through wedges or rollers can then be eliminated as well, so that the valve according to the invention can also be heated when it is in the closed state.

BRIEF DESCRIPTION OF THE DRAWINGS

FIG. 1 is a sectional view of a dual closure incorporating a preferred embodiment of the invention.

FIGS. 2 and 3 are sectional views of two other preferred embodiments of the invention.

DESCRIPTION OF THE PREFERRED EMBODIMENTS

In the embodiment shown in FIG. 1, a housing 1 is provided in which the sealing system 2 proper is swingably supported by means of bearing blocks 3 and 4, a carrier beam 5 and a pendulum rod 6. In the illustrated position, two facing valve plates 7 and 8 are disposed in front of respective apertures 9 and 10 which open into the valve housing 1 and which must be sealable under a high vacuum with the aid of the sealing system 2. For this purpose, the valve plates 7 and 8 cooperated with respective cylindrical seating faces 11 and 12 which are disposed at the interior surface of pipe stubs 13 and 14 extending into the housing 1. The axis of the valve seats is designated at 15.

For reasons of clarity, the type of mounting of the valve plates 7 and 8 at the pendulum rod 6 is not shown in precise detail. The important features are the bellows 16 which form a closed chamber 17 between the valve plates 7 and 8. If the pressure is increased in the chamber 17, the valve plates move in the direction toward the openings 7 and 8, up to abutments 18 and 19 provided within the respective pipe stubs 13 and 14. A further increase in the pressure in chamber 17 causes the outer sealing edges of plates 7 and 8 to be pressed against the cylindrical seating faces 11 and 12, whereby a seal is effected.

In order to prevent mutual contact of the actual sealing faces at the outer edge of plates 7 and 8 and in the region of the cylindrical sealing faces 11 and 12 before the spreading movement of plates 7 and 8, means are provided to center and guide the plates. For this purpose, the outer surfaces of the pipe stubs 13 and 14 disposed concentrically with axis 15 serve as the guide faces. The counterguide faces are the inner surfaces of angled components 20 and 21, whose one end is fastened to the outer zone of the valve plates 7 and 8 and whose other end passes over and is thus guided on the pipe stubs 13 and 14 during the movement of the plates 7 and 8 in the direction of the seating faces 11 and 12. During the spreading movement of plates 7 and 8 the guides 20 and 21 are lifted away from the outer face of the pipe stubs 13 and 14 and thus permit plates 7 and 8 to be centered.

In the embodiment shown in FIG. 2, the abutment 19 is formed by a separate ring 23 which is held inside the pipe stub 14 by means of a weld seam 24. The valve plate 7 assumes a position in which it rests against the sealing face 12 and the abutment 19. Thus a space 25 is obtained which can be evacuated through a gap 26 between the abutment ring 32 and the pipe stub 14. The gap 26 opens into an annular chamber 27 provided in the pipe stub 14. Channel 28 through which air can be extracted or through which compressed air can be introduced opens into the annular chamber 27. In FIG. 2, the opening 9 is shown sealed, that is, the plate 7 is spread and thus the part of the angle guide 21 which extends over the pipe stub 14 does not contact the external guide face thereof.

In the embodiment shown in FIG. 3 at least two lugs 30 (only one is visible in the partial sectional view) are provided instead of the pipe stub 14. The inner face 31 of each lug 30 serves as the guide face which together with the sealing face 12 is disposed on a cylindrical surface coaxial with the axis 15 and can therefore be machined easily together with the sealing face when jointly clamped. The counterguide face 32 is constituted by the outer edge of a disc or ring shaped carrier 33 which supports the valve plate 7 and which for this reason is coated in this region with a bearing material 34, preferably polyimide.

While FIGS. 2 and 3 show only the right hand side of the sealing assembly illustrated in FIG. 1, it is to be understood that in each instance the left hand side of the assembly may be similarly structured.

It will be understood that the above description of the present invention is susceptible to various modifications, changes and adaptations, and the same are intended to be comprehended within the meaning and range of equivalents of the appended claims.

We claim:
1. In a vacuum-tight closure assembly including means defining a valve seat; a spreadable valve plate movable into a closed position for assuming a spreaded state in which it sealingly engages the valve seat; and guide means for a centered guiding of the valve plate during its motion into the closed position; the improvement wherein said guide means comprises

(a) a plurality of lugs affixed to said means defining said valve seat; each said lug having a guide face being situated in the vicinity of said valve seat; and (b) a carrier affixed to and movable with said valve plate and having a periphery comprising counterguide faces; said guide faces of said lugs being oriented towards said counterguide faces of said carrier; said guide face cooperating with said counterguide faces during said motion of said valve plate.

2. In a vacuum-tight closure assembly including means defining a valve seat having a central axis; a spreadable valve plate movable into a closed position for assuming a spreaded state in which it sealingly engages the valve seat; and guide means for a centered guiding of the valve plate during its motion into the closed position; the improvement wherein said guide means comprises (a) means defining guide faces arranged in the vicinity of and stationarily with respect to said valve seat; and (b) a carrier affixed to and movable with said valve plate; said carrier having a circular periphery being concentric with said axis and comprising counterguide faces; said guide faces cooperating with said counterguide faces during said motion of said valve plate.

3. In a vacuum-tight closure assembly including means defining a valve seat having a central axis and a cylindrical surface; a spreadable valve plate movable into a closed position for assuming a spreaded state in which it sealingly engages the valve seat; and guide means for a centered guiding of the valve plate during its motion into the closed position; the improvement wherein said guide means comprises (a) a plurality of lugs affixed to said means defining said valve seat; each said lug having a guide face oriented towards said central axis and being concentric therewith; the guide faces being situated in the vicinity of said valve seat and being spaced therefrom in a direction parallel to said central axis; said guide faces and said valve seat defining adjacent cylindrical surfaces which are coaxial with said central axis and having identical diameters; and (b) means defining counterguide faces attached to and movable with said valve plate; said guide faces cooperating with said counterguide faces during said motion of said valve plate.

4. A vacuum-tight closure assembly as defined in claim 1, wherein said valve seat has a cylindrical surface and a central axis; further comprising an abutment extending about said axis and adjoining said valve seat; said abutment being arranged radially inwardly of said cylindrical surface; said abutment being arranged for engaging and stopping peripheral portions of said valve plate during its motion into the closed position.

5. A vacuum-tight closure assembly as defined in claim 1, 2 or 3, wherein cooperating sealing portions of said valve plate and said valve seat are of a nickel alloy having a high yield strength.

6. A vacuum-tight closure assembly as defined in claim 5, wherein sealing portions of said valve plate include a sealing edge coated with a noble metal.

7. A vacuum-tight closure assembly as defined in claim 1, 2 or 3, wherein said counterguide faces are coated with a bearing material.

8. A vacuum-tight closure assembly as defined in claim 7, wherein said material is polyimide.

9. A vacuum-tight closure assembly as defined in claim 1, wherein said valve seat has a central axis; further comprising an annulus surrounding said axis and supported adjacent said valve seat radially inwardly thereof; said annulus having a radial face constituting an abutment for engaging and stopping peripheral portions of said valve plate during its motion towards the closed position.

10. A vacuum-tight closure assembly as defined in claim 9, wherein said means defining said valve seat comprises a tubular member having an inner surface where said valve seat is arranged; said annulus being disposed in said tubular member.

11. A vacuum-tight closure assembly as defined in claim 2, wherein said periphery in its entirety constitutes said counterguide faces.

12. A vacuum-tight closure assembly as defined in claim 2, wherein said valve seat has a cylindrical surface; further comprising an abutment extending about said axis and adjoining said valve seat; said abutment being arranged radially inwardly of said cylindrical surface; said abutment being arranged for engaging and stopping peripheral portions of said valve plate during its motion into the closed position.

13. A vacuum-tight closure assembly as defined in claim 2 or 3, further comprising an annulus surrounding said axis and supported adjacent said valve seat radially inwardly thereof; said annulus having a radial face constituting an abutment for engaging and stopping peripheral portions of said valve plate during its motion towards the closed position.

14. A vacuum-tight closure assembly as defined in claim 13, wherein said means defining said valve seat comprises a tubular member having an inner surface where said valve seat is arranged; said annulus being disposed in said tubular member.

15. A vacuum-tight closure assembly as defined in claim 3, further comprising an abutment extending about said axis and adjoining said valve seat; said abutment being arranged radially inwardly of said cylindrical surface; said abutment being arranged for engaging and stopping peripheral portions of said valve plate during its motion into the closed position.

16. A vacuum-tight closure assembly as defined in claim 1 or 3, wherein said assembly is a pendulum valve assembly.

17. A vacuum-tight closure assembly as defined in claim 1, 2 or 3, wherein said assembly is a dual seat assembly.

* * * * *

UNITED STATES PATENT AND TRADEMARK OFFICE
CERTIFICATE OF CORRECTION

PATENT NO. : 4,244,557
DATED : January 13, 1981
INVENTOR(S) : Wilhelm Polhede et al It is certified that error appears in the above—identified patent and that said Letters Patent is hereby corrected as shown below:

Column 1, line 18, delete "for" (second occurrence); line 49,

"the" (first occurrence) should read -- an --.
Column 2, line 7, change "compartments" to --components--'
  line 27, before "this" insert --seat;--;
  line 44, insert a comma (,) after "is";
  line 48, change "sealing-faces" to --sealing faces--;
  line 50, delete "to";
  line 61, delete "to";
  line 65, change to read --and then elastically deformable. Slight relative errors in--

Column 3, line 59, change "cooperated" to --cooperate--.

Column 6, line 2, change "claim 1 or 3" to --claim 1, 2 or 3--.

Signed and Sealed this

Thirteenth Day of April 1982

[SEAL]

Attest:

GERALD J. MOSSINGHOFF

Attesting Officer   Commissioner of Patents and Trademarks

UNITED STATES PATENT AND TRADEMARK OFFICE
CERTIFICATE OF CORRECTION

PATENT NO. : 4,244,557
DATED : January 13th, 1981
INVENTOR(S) : Wilhelm Polhede et al It is certified that error appears in the above—identified patent and that said Letters Patent is hereby corrected as shown below:

Column 1, line 18, delete "for" (second occurrence); line 49, "the" (first occurrence) should read -- an --.

Column 2, line 7, change "compartments" to --components--;
　　　　　line 27, before "this" insert --seat;--;
　　　　　line 44, insert a comma (,) after "is",
　　　　　line 48, change "sealing-faces" to --sealing faces--;
　　　　　line 50, delete "to";
　　　　　line 61, delete "to";
　　　　　line 65, change to read --and then elastically
deformable. Slight relative errors in--

Column 3, line 59, change "cooperated" to --cooperate--.

Column 6, line 55, change "claim 1 or 3" to --claim 1, 2 or 3--

This certificate supercedes Certificate of Correction issued April 13, 1982.

Signed and Sealed this

Twenty-second Day of June 1982

[SEAL]

Attest:

Attesting Officer

GERALD J. MOSSINGHOFF
Commissioner of Patents and Trademarks